United States Patent
Watanabe

(10) Patent No.: US 10,038,211 B2
(45) Date of Patent: Jul. 31, 2018

(54) FUEL CELL STACK MANUFACTURING METHOD

(71) Applicant: TOYOTA JIDOSHA KABUSHIKI KAISHA, Toyota-shi, Aichi-ken (JP)

(72) Inventor: Kazuhiro Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 472 days.

(21) Appl. No.: 14/683,182

(22) Filed: Apr. 10, 2015

(65) Prior Publication Data

US 2015/0295268 A1    Oct. 15, 2015

(30) Foreign Application Priority Data

Apr. 11, 2014 (JP) .................................. 2014-081505

(51) Int. Cl.
| | |
|---|---|
| *H01M 8/24* | (2016.01) |
| *H01M 8/248* | (2016.01) |
| *H01M 8/2404* | (2016.01) |
| *H01M 8/1018* | (2016.01) |

(52) U.S. Cl.
CPC ......... *H01M 8/248* (2013.01); *H01M 8/2404* (2016.02); *H01M 2008/1095* (2013.01); *Y02P 70/56* (2015.11)

(58) Field of Classification Search
CPC ...... H01M 8/248; H01M 8/2404; Y02P 70/56
See application file for complete search history.

(56) References Cited

U.S. PATENT DOCUMENTS

| | | | |
|---|---|---|---|
| 2009/0087717 A1 | 4/2009 | Akimoto | |
| 2010/0159345 A1* | 6/2010 | Shibata | H01M 8/248 429/470 |
| 2011/0294030 A1 | 12/2011 | Yamamoto | |
| 2015/0118593 A1* | 4/2015 | Morimoto | H01M 8/2465 429/465 |

FOREIGN PATENT DOCUMENTS

| | | |
|---|---|---|
| CN | 101160682 A | 4/2008 |
| CN | 102282713 A | 12/2011 |
| JP | 2006-294492 | 10/2006 |
| JP | 2009-212032 | 9/2009 |
| WO | WO 2010/090003 A1 | 8/2010 |

* cited by examiner

*Primary Examiner* — Stephan Essex
(74) *Attorney, Agent, or Firm* — Finnegan, Henderson, Farabow, Garrett & Dunner, LLP

(57) ABSTRACT

A fuel cell stack manufacturing method includes: a step of disposing a fuel cell stack so as to be sandwiched between a first fastening member and a second fastening member; a step of temporarily fastening the fuel cell stack by inserting a jig into a hole-form first connecting portion formed on each end portion of the first fastening member and a second connecting portion formed on each end portion of the second fastening member while applying pressure to the fuel cell stack at a predetermined load; a step of performing aging processing on the temporarily fastened fuel cell stack in order to advance creep deformation of the fuel cell stack; and a step of inserting a pin into the first connecting portion and the second connecting portion while reapplying the pressure.

3 Claims, 9 Drawing Sheets

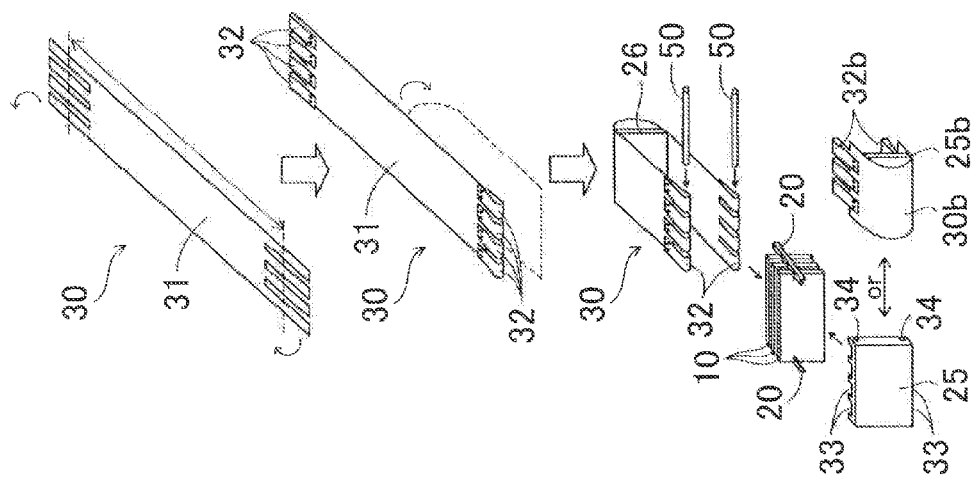

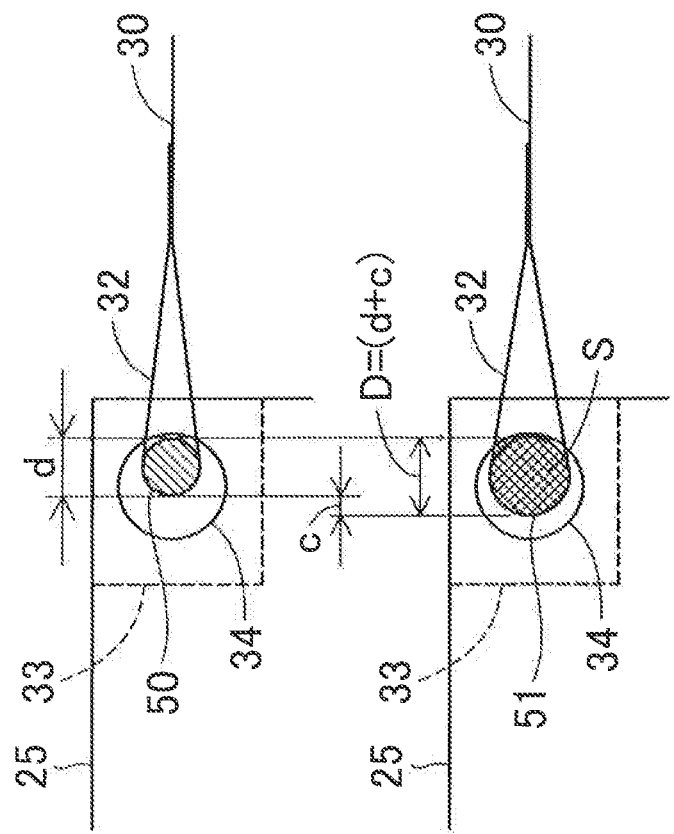

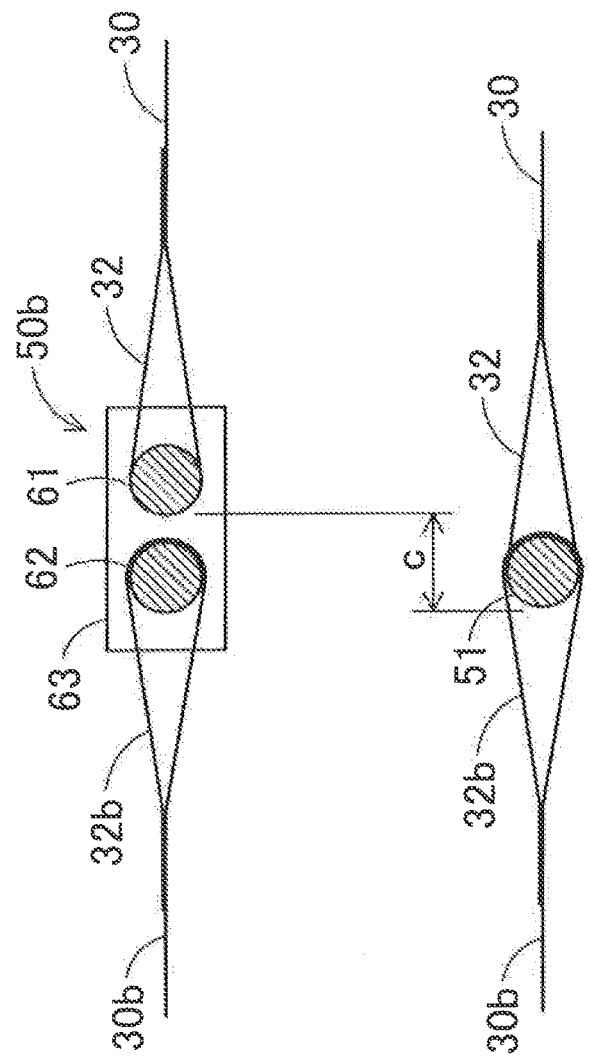

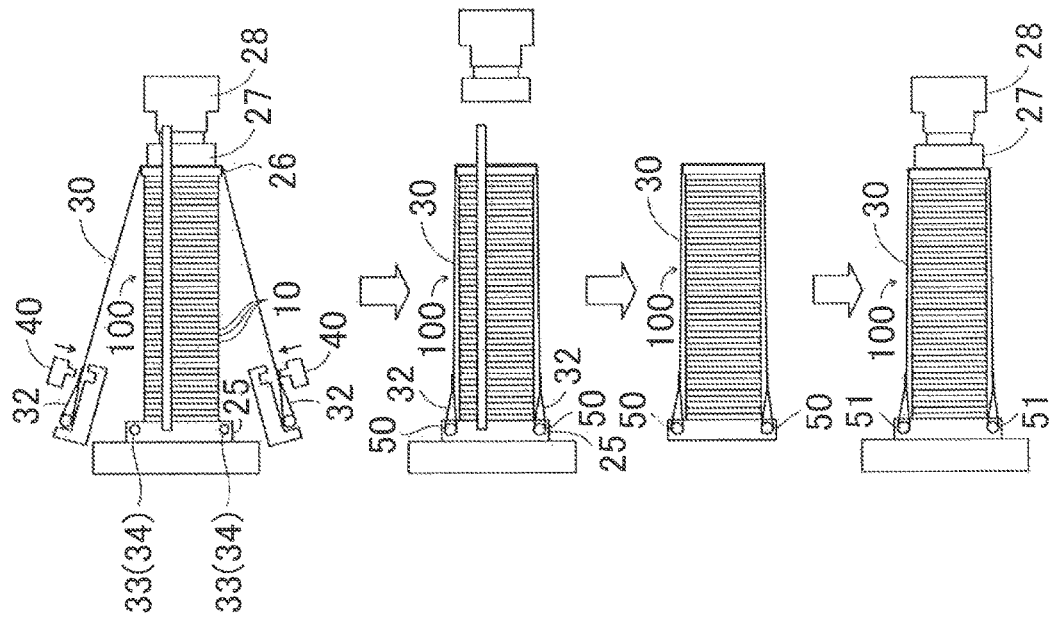

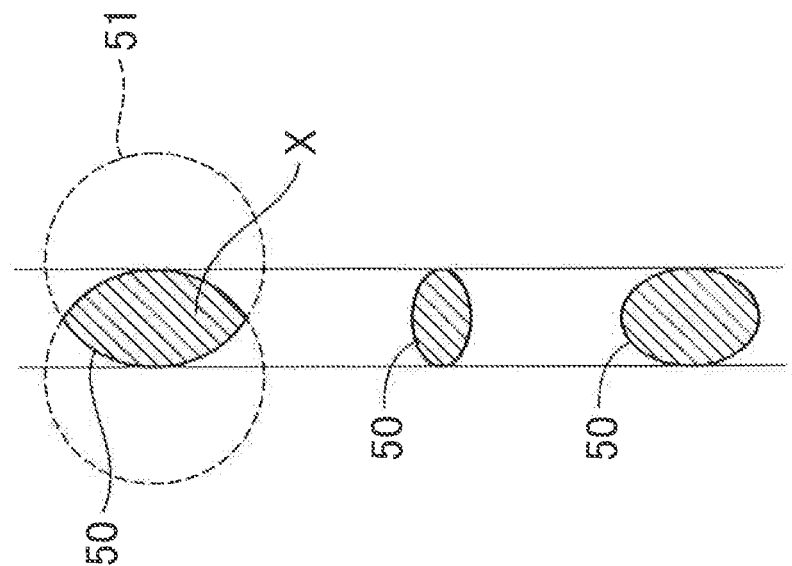

US 10,038,211 B2

FUEL CELL STACK MANUFACTURING METHOD

INCORPORATION BY REFERENCE

The disclosure of Japanese Patent Application No. 2014-081505, filed on Apr. 11, 2014 including the specification, drawings and abstract, is incorporated herein by reference in its entirety.

BACKGROUND OF THE INVENTION

1. Field of the Invention

The invention relates to a method of manufacturing a fuel cell stack.

2. Description of Related Art

In a technique described in Japanese Patent Application Publication No. 2006-294492 (JP 2006-294492 A), for example, in relation to a method of manufacturing a fuel cell stack, fuel cells are laminated using a tension plate and a bolt, whereupon aging processing is performed to advance initial creep by exerting a compressive load on the fuel cell stack. Following the aging processing, the fuel cell stack is tightened by rotating an adjusting screw provided in an endplate.

In the manufacturing method described in JP 2006-294492 A, however, the adjusting screw used to tighten the fuel cell stack has a large size relative to the size of the stack, and moreover, a mechanism used to tighten the stack is complicated. As a result, an increase occurs in an overall weight of the fuel cell stack. Demand therefore exists for a technique with which a fuel cell stack can be manufactured with a simpler configuration. Furthermore, in a conventional fuel cell stack manufacturing method, demand exists for a reduction in a manufacturing cost of the fuel cell stack, simplification of manufacturing facilities, and so on.

SUMMARY OF THE INVENTION

An aspect of the invention is a fuel cell stack manufacturing method including: a first step of disposing a strip-form first fastening member and a second fastening member such that a first end portion of the first fastening member is adjacent to a first end portion of the second fastening member and a second end portion of the first fastening member is adjacent to a second end portion of the second fastening member, and disposing a fuel cell stack formed from a plurality of laminated fuel cells so as to be sandwiched between the first fastening member and the second fastening member in a lamination direction; a second step of temporarily fastening the fuel cell stack by inserting a jig into a hole-form first connecting portion formed on the first and second end portions of the first fastening member and a second connecting portion formed on the first and second end portions of the second fastening member while applying pressure to the fuel cell stack at a predetermined load in order to connect the first fastening member to the second fastening member; a third step of performing aging processing on the temporarily fastened fuel cell stack in order to advance creep deformation of the fuel cell stack; and a fourth step of reapplying pressure to the fuel cell stack in order to tighten the fuel cell stack, and while reapplying the pressure, inserting a pin having a diameter that corresponds to a surface area, by which the first connecting portion and the second connecting portion overlap when the pressure is reapplied, into the first connecting portion and the second connecting portion. According to this manufacturing method, a simple mechanism is used to tighten the fuel cell stack, and therefore an overall weight of the fuel cell stack can be reduced. Further, the pressure applied to advance the creep deformation of the fuel cell stack can be maintained easily. As a result, the fuel cell stack can be manufactured with a simple configuration.

The manufacturing method may further include a fifth step performed prior to the second step to measure a length of the fuel cell stack in the lamination direction when the predetermined load is exerted on the fuel cell stack, and adjust a length of the first fastening member in accordance with the measured length. With the fuel cell stack manufacturing method according to this aspect, a first fastening member that corresponds to the length of the fuel cell stack can be prepared, thereby eliminating the need to absorb variation in the length of the fuel cell stack using a member (a spacer) such as a shim plate or a plate spring. As a result, the fuel cell stack can be manufactured with a simple configuration.

In the fifth step, the length of the first fastening member may be adjusted by adjusting a position in which at least one of the first end portion and the second end portion of the first fastening member is folded back in order to form the first connecting portion in hole form. With the fuel cell stack manufacturing method according to this aspect, the length of the first fastening member can be adjusted easily.

The second fastening member may be an endplate adjacent to the fuel cell stack. With the fuel cell stack manufacturing method according to this aspect, the first fastening member can be connected to the second fastening member easily.

The second fastening member may be strip-shaped, and the second connecting portion may be formed as a hole. With the fuel cell stack manufacturing method according to this aspect, a manufacturing cost of the second fastening member can be reduced.

The invention is not limited to the aspects of the fuel cell stack manufacturing method described above, and may be realized in various other embodiments. For example, the invention may be realized in embodiments such as a fuel cell stack manufactured using this manufacturing method, or a vehicle including the fuel cell stack.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A to 3C are schematic illustrative views of the fuel cell stack manufacturing method;

FIGS. 4A and 4B are views showing a diameter of a temporary fastening jig and a diameter of a finished product pin;

FIGS. 6A and 6B are illustrative views showing a temporary fastening jig and a finished product pin according to a first modified example;

FIGS. 8A to 8D are illustrative views showing a fuel cell stack manufacturing method according to a third modified example; and FIGS. 9A to 9C are views showing other embodiments of the temporary fastening jig.

DETAILED DESCRIPTION OF EMBODIMENTS

A. First Embodiment

Figure 1:
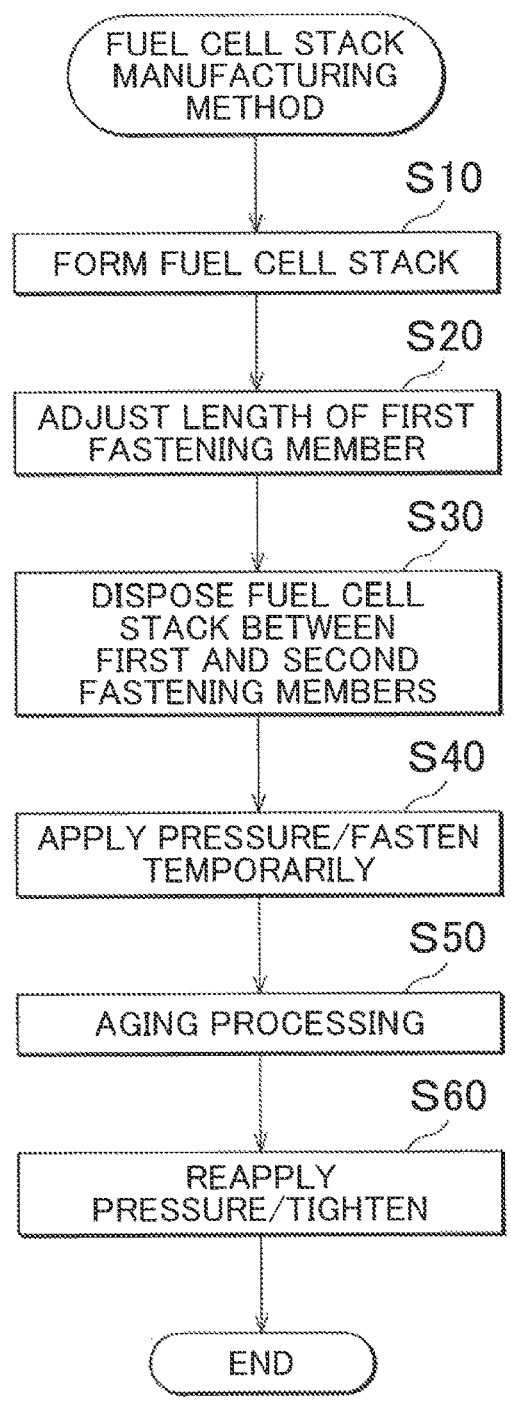
FIG. 1 is a process drawing showing a fuel cell stack manufacturing method serving as a first embodiment.

FIG. 1 is a process drawing showing a fuel cell stack manufacturing method serving as a first embodiment of the invention. FIGS. 2A to 2C and FIG. 3 are schematic illustrative views of the fuel cell stack manufacturing method. In the manufacturing method according to this embodiment, first, a plurality of fuel cells are laminated to form a fuel cell stack 100 (step S10). The fuel cells according to this embodiment are polymer electrolyte fuel cells. Each fuel cell is formed by disposing a catalyst electrode layer and a gas diffusion layer on respective surfaces of an electrolyte membrane having proton conductivity, and sandwiching the catalyst electrode layer and the gas diffusion layer between a pair of separators.

Figure 2A:
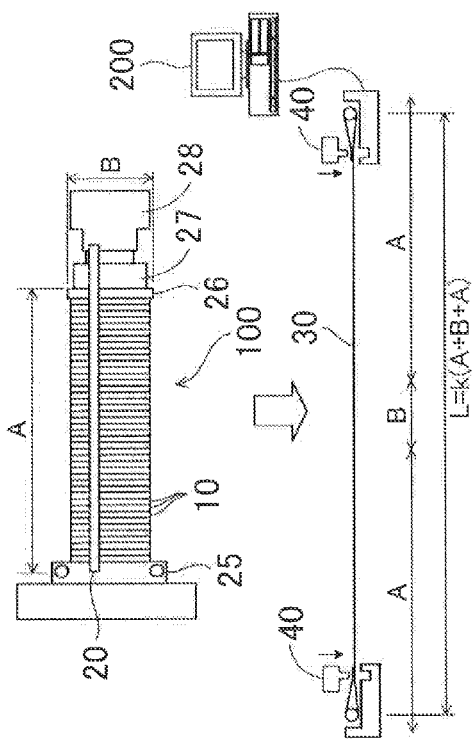
FIGS. 2A to 2C are schematic illustrative views of the fuel cell stack manufacturing method.
Figure 2B:

In step S10, as shown in FIGS. 2A and 3C, the plurality of fuel cells 10 are arranged so as be suspended between two rod-shaped laminating guides 20 using notches formed in respective side faces of the fuel cells 10. A first endplate 25 is then disposed on one end side of the plurality of fuel cells 10, while a plate-shaped second endplate 26, a load sensor (a load cell) 27, and a pressing cylinder 28 are disposed on another end side. In this condition, the fuel cells 10 are pressed by having the pressing cylinder 28 apply a prescribed load to the fuel cell 10 side, and as a result, the fuel cell stack 100 is formed. The fuel cell stack 100 may be formed using another method.

After the fuel cell stack 100 is formed in step S10, next, a length of a first fastening member 30 used to fasten the fuel cell stack 100 is adjusted (step S20). In step S20, first, as shown in FIG. 2A, a length A of the fuel cell stack 100 in a lamination direction is measured using a displacement gauge while applying pressure to the fuel cell stack 100, and a resulting value is transmitted to a computer 200. The computer 200 calculates a length L of the first fastening member 30 on the basis of the length A transmitted thereto from the displacement gauge. The length L can be determined using Equation (1), shown below. In Equation (1), B is a measured height of the second endplate 26 in a vertical direction. Further, k is a coefficient determined through experiment in consideration of an amount by which the first fastening member 30 stretches when fastening the fuel cell stack 100, and is set to be larger than 0 and smaller than 1. k can be determined in accordance with a modulus of elasticity of the first fastening member 30, an environmental temperature, and so on.

$$L = k(A + B + A) \tag{1}$$

After the length L of the first fastening member 30 has been calculated by the computer 200, first, as shown in FIG. 3A, the strip-form first fastening member 30 is prepared. The first fastening member 30 is formed from a stainless steel plate material having a thickness of 0.5 to 1.5 mm, for example. Comb-shaped slits are provided in each end of the first fastening member 30. As shown in FIG. 3A, both ends of the first fastening member 30 are folded back toward the opposite side end portions. At this time, the computer 200 adjusts the length of the first fastening member 30 to the length L calculated in advance by controlling a device that folds back the two ends of the first fastening member 30 in order to adjust a position in which the two ends of the first fastening member 30 are folded back. After the two ends of the first fastening member 30 have been folded back in this manner, the computer 200 fixes the two ends of the first fastening member 30 to a main body portion 31 of the first fastening member 30 using a caulking device 40 (see FIG. 2B) connected to the computer 200. As a result, as shown in FIG. 3B, a plurality of hole-form (ring-shaped) first connecting portions 32 are formed on each end portion of the first fastening member 30. The two ends of the first fastening member 30 may be fixed to the main body portion 31 by spot welding, mechanical clinching, and so on, for example, instead of caulking.

Figure 2C:
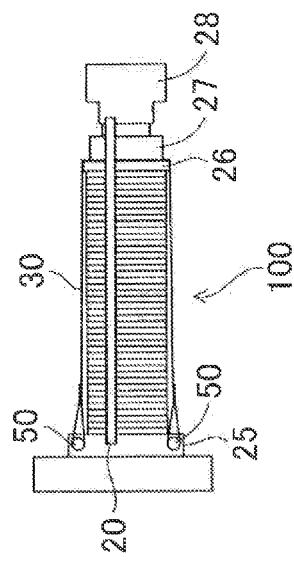

After the length of the first fastening member 30 has been adjusted in step S20, the pressure applied to the fuel cell stack 100 by the pressing cylinder 28 is released, whereby the fuel cell stack 100 is disposed between the first fastening member 30 and a second fastening member 25 (the first endplate 25) (step S30). Next, as shown in FIG. 2C, the fuel cell stack 100 is temporarily fastened by connecting the first fastening member 30 to the second fastening member 25 (the first endplate 25) while applying pressure to the fuel cell stack 100 (step S40). In this embodiment, the first endplate 25 corresponds to the second fastening member, and therefore the first endplate 25 will also be referred to as the "second fastening member 25".

In step S30, as shown in FIG. 3C, the first fastening member 30 is bent such that the first connecting portions 32 formed on the respective end portions of the first fastening member 30 face the second fastening member 25 side. The first fastening member 30 and the second fastening member 25 are then disposed such that one end of the first fastening member 30 is adjacent to one end of the second fastening member 25 and the other end of the first fastening member is adjacent to the other end of the second fastening member 25, whereby the fuel cell stack 100 (as well as the second endplate 26) is disposed so as to be sandwiched between the first fastening member 30 and the second fastening member 25 in the lamination direction.

In step S40, the plurality of hole-form first connecting portions 32 provided on the respective end portions of the first fastening member 30 are fitted respectively into a plurality of recessed second connecting portions 33 provided in the second fastening member 25, as shown in FIG. 3C, while applying pressure to the fuel cell stack 100 using the pressing cylinder 28 via the first fastening member 30 and the second endplate 26. The first fastening member 30 and the second fastening member 25 are then connected by inserting a temporary fastening jig 50 into through holes 34 that penetrate respective side walls of the second connecting portions 33 and the hole-form first connecting portions 32, whereby the fuel cell stack 100 is fastened. In this embodiment, the temporary fastening jig 50 is a pin-shaped member.

After the fuel cell stack 100 is temporarily fastened in step S40, aging processing is performed while the fuel cell stack 100 is temporarily fastened (but the pressure applied by the pressing cylinder 28 is released) (step S50). In the aging processing, creep deformation of the fuel cell stack 100 is advanced. During the aging processing, a leak test and a power generation test may be performed on the fuel cell stack 100. The leak test is a test performed to determine whether or not reaction gas has leaked to the outside from the interior of the fuel cell stack 100. The power generation test is a test performed to determine whether or not a prescribed power is output from the fuel cell stack 100 by operating the fuel cell stack 100. When the fuel cell stack 100 does not pass these tests, following processes are canceled.

FIGS. 4A and 4B are views showing a diameter of the temporary fastening jig 50 and a diameter of a finished product pin 51. When the aging processing of step S50 is completed, pressure is reapplied to the fuel cell stack 100, and the fuel cell stack 100 is tightened (step S60). More specifically, the temporary fastening jig 50 (see FIG. 4A) inserted into the first connecting portions 32 and the second connecting portions 33 in step S40 is exchanged for the finished product pin 51 (see FIG. 4B) while reapplying pressure to the fuel cell stack 100 using the pressing cylinder 28 (or another pressing device). As a result, the fuel cell stack 100 remains in a tightened condition in accordance with a difference between the diameter of the temporary fastening jig 50 and the diameter of the finished product pin 51 even after the pressure applied by the pressing cylinder 28 is released. A diameter D of the finished product pin 51 corresponds to a surface area S of a region in which the first connecting portion 32 and the second connecting portion 33 overlap when pressure is reapplied to the fuel cell stack 100. The finished product pin 51 according to this embodiment has a circular cross-section, and therefore the diameter D of the finished product pin 51 increases as the surface area S increases. More specifically, the region in which the first connecting portion 32 and the second connecting portion 33 overlap is a region in which an interior space of the hole-form first connecting portion 32 and an interior space of the through hole 34 provided in the second connecting portion 33 overlap when seen from an axial direction of the finished product pin 51.

The diameter D can be expressed as shown below in Equation (2), for example. In Equation (2), d is the diameter of the temporary fastening jig 50, and c is an experimentally determined value (an average of past values, for example) of an amount of creep (an amount of contraction) in the length A of the fuel cell stack 100. The creep amount c is between 1 and 3 mm, for example.

$$D=d+c \qquad (2)$$

After the fuel cell stack 100 has been tightened in this manner, the pressure applied by the pressing cylinder 28 is released, whereby the fuel cell stack 100 is complete. Note that by detecting load variation occurring when the pressure applied by the pressing cylinder 28 is released using the load sensor 27, it is possible to test whether or not a prescribed load is exerted on the fuel cell stack 100 upon insertion of the finished product pin 51.

In the method of manufacturing the fuel cell stack 100 according to this embodiment, as described above, the fuel cell stack 100 is temporarily fastened and tightened simply by inserting the temporary fastening jig 50 and the finished product pin 51 into the first connecting portions 32 and the second connecting portions 33 provided respectively on the first fastening member 30 and the second fastening member 25 of the fuel cell stack 100. Therefore, a mechanism with which pressure is maintained during temporary fastening and tightening is performed can be simplified, and as a result, an overall weight of the fuel cell stack 100 can be reduced.

Further, in the manufacturing method according to this embodiment, the fuel cell stack 100 is formed by laminating the fuel cells 10, whereupon the actual length of the fuel cell stack 100 is measured and the length of the first fastening member 30 is adjusted. Hence, there is no need to insert a member (a spacer) for adjusting the length of the fuel cell stack 100, such as a shim plate or a plate spring, into an end portion of the fuel cell stack 100, for example, in order to absorb variation in the length of the fuel cell stack 100. As a result, the fuel cell stack 100 can be manufactured with a simple configuration.

Furthermore, in this embodiment, the length L of the first fastening member 30 is adjusted by adjusting the positions in which the two end portions of the first fastening member 30 are folded back, and therefore the length L of the first fastening member 30 can be adjusted easily.

Moreover, in the manufacturing method according to this embodiment, the fuel cell stack 100 is fastened using the temporary fastening jig 50 and the finished product pin 51, as described above. Therefore, in a case where the load sensor 27 determines that the prescribed load is not being exerted on the fuel cell stack 100 or the like, for example, the fuel cells 10 can be replaced or re-laminated easily by removing the pins. Furthermore, every time the fuel cells 10 are replaced or re-laminated, the length of the first fastening member 30 can be adjusted in accordance with the measured value of the actual length of the fuel cell stack 100. Hence, with the manufacturing method according to this embodiment, when the fuel cell stack 100 requires maintenance, the maintenance can be completed quickly.

B. Second Embodiment

In the first embodiment described above, the fuel cell stack 100 is fastened (temporarily fastened and tightened) by connecting the first fastening member 30 to the first endplate 25. In a second embodiment, on the other hand, the fuel cell stack 100 is fastened by connecting the first fastening member 30 to a strip-form second fastening member having a similar form to the first fastening member 30.

FIG. 3C shows a first endplate 25b having a similar shape to the second endplate 26, and a strip-form second fastening member 30b. Similarly to the first fastening member 30, a plurality of hole-form second connecting portions 32b are formed on respective end portions of the second fastening member 30b. The second connecting portions 32b are formed so as to fit respectively into intervals between the first connecting portions 32. In the second embodiment, the second fastening member 30b and the first endplate 25b are used instead of the first endplate 25 according to the first embodiment.

Figures 5A, 5B:
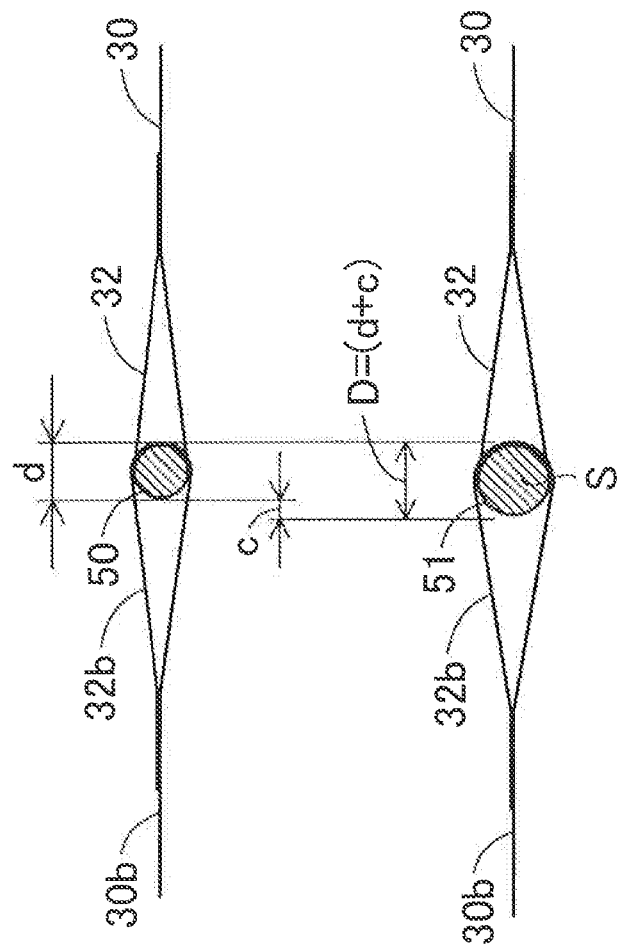
FIGS. 5A and 5B are illustrative views showing a temporary fastening jig and a finished product pin according to a second embodiment.

FIGS. 5A and 5B are illustrative views showing the temporary fastening jig 50 and the finished product pin 51 according to the second embodiment. As shown in FIGS. 5A and 5B, the temporary fastening jig 50 and the finished product pin 51 according to the second embodiment have similar shapes and dimensions to those of the first embodiment (see FIGS. 4A and 4B). In this embodiment, the temporary fastening jig 50 and the finished product pin 51 are inserted into the hole-form first connecting portions 32 formed on the respective end portions of the first fastening member 30 and the hole-form second connecting portions 32b formed on the respective end portions of the second fastening member 30b. The diameter D of the finished product pin 51 corresponds to a surface area S of a region in which the first connecting portion 32 and the second connecting portion 32b overlap when pressure is reapplied to the fuel cell stack 100 in order to tighten the fuel cell stack 100. More specifically, the region in which the first connecting portion 32 and the second connecting portion 32b overlap is a region in which the interior space of the hole-form first connecting portion 32 and an interior space of the hole-form second connecting portion 32b overlap when seen from the axial direction of the finished product pin 51.

According to the second embodiment, as described above, the second fastening member 30b can be formed from an identical material to the first fastening member 30. A manufacturing cost of the second fastening member 30b can therefore be reduced. Moreover, all of the effects of the first embodiment can be obtained likewise with the second embodiment.

A decision as to whether to employ the first embodiment or the second embodiment may be made on the basis of ease of attachment and manufacturing cost. For example, when the first embodiment is employed, the second fastening member is constituted by the first endplate 25, and therefore the strip-form first fastening member 30 can be connected (attached) to the second fastening member easily. When the second embodiment is employed, on the other hand, the manufacturing cost of the second fastening member can be reduced, enabling a reduction in the overall manufacturing cost of the fuel cell stack 100.

C. Modified Examples

First Modified Example

The temporary fastening jig 50 used in the second embodiment is similar to the temporary fastening jig 50 used in the first embodiment. In a first modified example, on the other hand, a temporary fastening jig having a different form to the temporary fastening jig 50 according to the first embodiment is used. All other configurations are identical to the second embodiment.

FIGS. 6A and 6B are illustrative views showing a temporary fastening jig and a finished product pin according to the first modified example. A temporary fastening jig 50b according to the first modified example includes a first pin 61 and a second pin 62. The first pin 61 is inserted into the first connecting portions 32 formed on the first fastening member 30. The second pin 62, meanwhile, is inserted into the second connecting portions 32b formed on the second fastening member 30b. The first pin 61 and the second pin 62 are fixed so as to be parallel to each other by a frame body 63 formed by the through holes into which the pins are inserted. A distance between the first pin 61 and the second pin 62 is set in accordance with the creep amount c of the fuel cell stack 100. Identical pins to the finished product pin 51 may be used as the first pin 61 and the second pin 62.

According to the first modified example, described above, identical pins to the finished product pin 51 can be used as the first pin 61 and the second pin 62 used as the temporary fastening jig 50b, and therefore the manufacturing cost of the fuel cell stack 100 can be reduced. Moreover, all of the effects of the first and second embodiments can be obtained likewise with the first modified example.

Second Modified Example

In the first modified example, two ring-shaped connecting portions 32, 32b are connected by the temporary fastening jig 50b including the two pins 61, 62. In a second modified example, on the other hand, the second connecting portions 33 formed on the first endplate 25 and ring-shaped first connecting portions 32 are connected by a temporary fastening jig having two pins.

Figures 7A, 7B:
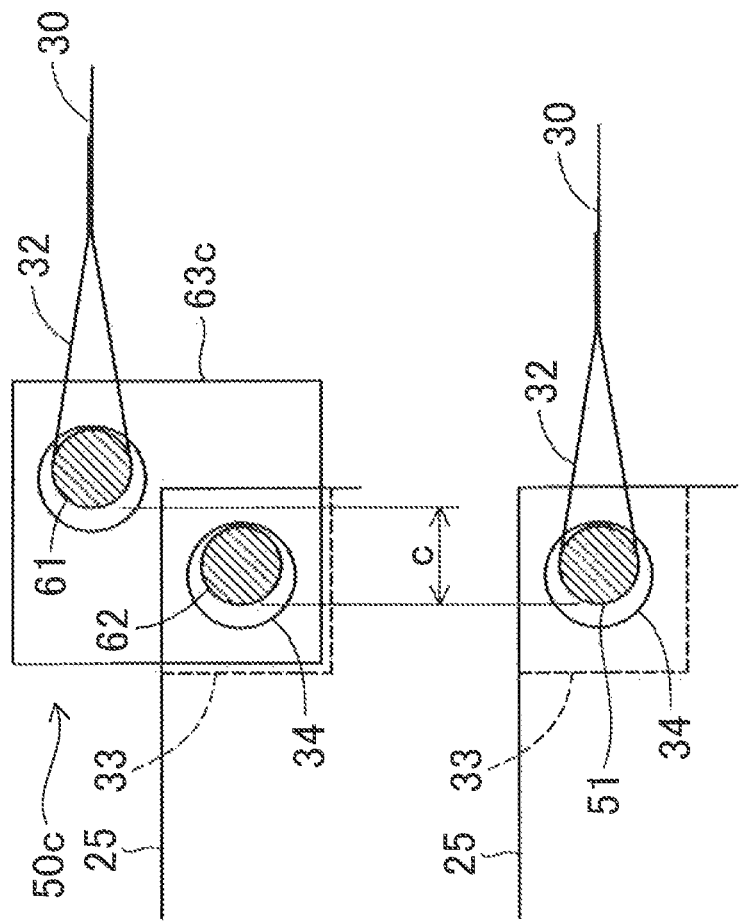
FIGS. 7A and 7B are illustrative views showing a temporary fastening jig and a finished product pin according to a second modified example.

FIGS. 7A and 7B are illustrative views showing a temporary fastening jig and a finished product pin according to the second modified example. A temporary fastening jig 50c according to the second modified example includes the first pin 61 and the second pin 62, similarly to the first modified example. The first pin 61 is inserted into the first connecting portions 32 formed on the first fastening member 30. The second pin 62, meanwhile, is inserted into the through holes 34 of the second connecting portions 33 formed on the first endplate 25 serving as the second fastening member. The first pin 61 and the second pin 62 are fixed so as to be parallel to each other by a frame body 63c formed by the through holes into which the pins are inserted. The distance between the first pin 61 and the second pin 62 is set in accordance with the creep amount c of the fuel cell stack 100. Note, however, that in this modified example, the first pin 61 and the second pin 62 are fixed so as to be offset from each other in the vertical direction. Further, the frame body 63c is disposed along a wall surface of the second connecting portions 33 and fixed so as not to rotate about the second pin 62. In the second modified example, the first pin 61 is disposed so as to be offset from the second pin 62 in the vertical direction, as described above, and therefore contact between the first pin 61 and the first endplate 25 is suppressed.

According to the second modified example, described above, identical pins to the finished product pin 51 can be used as the first pin 61 and the second pin 62 used as the temporary fastening jig 50c, and therefore the manufacturing cost of the fuel cell stack 100 can be reduced. Moreover, all of the effects of the first embodiment can be obtained likewise with the second modified example.

Third Modified Example

In the first embodiment, as shown in FIG. 1 and FIGS. 2A to 2C, the length of the first fastening member 30 is adjusted after forming the fuel cell stack 100. In a third modified example, on the other hand, the length of the first fastening member 30 is adjusted at the same time as the fuel cell stack 100 is formed.

FIGS. 8A to 8D are illustrative views showing a method of manufacturing the fuel cell stack 100 according to the third modified example. In the third modified example, first, as shown in FIG. 8A, the fuel cell stack 100 is formed by laminating the fuel cells 10 between the strip-form first fastening member 30 and the first endplate 25 serving as the second fastening member, and applying pressure thereto using the pressing cylinder 28.

In this modified example, with the fuel cell stack 100 formed in the manner described above, the hole-form first connecting portions 32 are formed on the respective end portions of the first fastening member 30 by the caulking device 40, which is disposed above and below the fuel cell stack 100, without releasing the pressure applied by the pressing cylinder 28.

Next, as shown in FIG. 8B, the temporary fastening jig 50 is inserted into the first connecting portions 32 and the through holes 34 of the second connecting portions 33 formed on the first endplate 25, whereby the first fastening member 30 and the first endplate 25 are connected and the fuel cell stack 100 is temporarily fastened. Once the fuel cell stack 100 has been temporarily fastened, the pressure applied by the pressing cylinder 28 is released.

After temporarily fastening the fuel cell stack 100, aging processing is performed on the fuel cell stack 100, as shown in FIG. 8C. Next, as shown in FIG. 8D, the temporary fastening jig 50 is exchanged for the finished product pin 51 while reapplying pressure using the pressing cylinder 28. The pressure applied by the pressing cylinder 28 is then released, whereby the fuel cell stack 100 is complete.

In the manufacturing method according to the third modified example, described above, the length of the first fastening member 30 is adjusted at the same time as the fuel cell stack 100 is formed (in other words, steps S10 to S30 of FIG. 1 are performed simultaneously), and therefore there is no need to release the pressure exerted on the fuel cell stack 100 by the pressing cylinder 28 in order to set the length-adjusted first fastening member 30. Hence, the fuel cell stack 100 can be manufactured easily. Furthermore, by adjusting a caulking position of the caulking device 40 to an optimum position in advance, the computer 200 used to calculate the length of the first fastening member 30 can be omitted.

Fourth Modified Example

FIGS. 9A to 9C are views showing other embodiments of the temporary fastening jig. As shown in FIGS. 9A to 9C, the cross-section of the pin used as the temporary fastening jig 50 need not be circular. As shown in FIG. 9A, for example, the cross-section of the pin may take the shape of a cross-section overlap portion X obtained when the cross-section of the finished product pin 51 having a circular cross-section is offset by several mm. When the pin is formed with this cross-section, a load exerted on the hole-form connecting portions (the first connecting portions 32 and the second connecting portions 32b) can be dispersed, and as a result, plastic deformation of the connecting portions can be suppressed.

Further, as shown in FIG. 9B or FIG. 9C, the cross-section of the pin may be elliptical. When the pin is formed with an elliptical cross-section, no angular portions exist on the cross-section of the pin, and therefore damage to inner surfaces of the connecting portions during insertion of the pin into the hole-form connecting portions can be suppressed. Furthermore, when an ellipse that is substantially parallel to a fastening member having a strip-form short axis is used, as shown in FIG. 9C, the load exerted on the hole-form connecting portions can be dispersed, similarly to FIG. 9A, and as a result, damage to the inner surfaces of the connecting portions during insertion of the pin into the hole-form connecting portions can be further suppressed.

Additionally, the material of the temporary fastening jig 50 may be identical or different to the material of the finished product pin 51. In consideration of wear caused by repeated use, for example, the material of the temporary fastening jig 50 may be stronger than the material of the finished product pin 51. Moreover, the material of the temporary fastening jig 50 may be subjected to surface treatment in order to increase the strength of the temporary fastening jig 50.

The invention is not limited to the embodiments and modified examples described above, and may be realized in various embodiments within a scope that does not depart from the spirit thereof. For example, to solve all or a part of the problems described above, or to achieve all or a part of the effects described above, technical features of the embodiments and modified examples corresponding to technical features of the aspects described in the Summary of the Invention may be replaced or combined as appropriate. Further, technical features that are not described as being essential in the specification may be omitted as appropriate.

What is claimed is:

1. A fuel cell stack manufacturing method comprising:
a first step of disposing a strip-form first fastening member and a second fastening member such that a first end portion of the first fastening member is adjacent to a first end portion of the second fastening member and a second end portion of the first fastening member is adjacent to a second end portion of the second fastening member, and disposing a fuel cell stack formed from a plurality of laminated fuel cells so as to be sandwiched between the first fastening member and the second fastening member in a lamination direction;
a second step of temporarily fastening the fuel cell stack by inserting a jig into a hole-form first connecting portion formed on the first and second end portions of the first fastening member and a second connecting portion formed on the first and second end portions of the second fastening member while applying pressure to the fuel cell stack at a predetermined load in order to connect the first fastening member to the second fastening member;
a third step of performing aging processing on the temporarily fastened fuel cell stack in order to advance creep deformation of the fuel cell stack; and
a fourth step of reapplying pressure to the fuel cell stack in order to tighten the fuel cell stack, and while reapplying the pressure, inserting a pin having a diameter that corresponds to a dimension of a region in which the first connecting portion and the second connecting portion overlap when the pressure is reapplied, into the first connecting portion and the second connecting portion,
wherein the second fastening member is an endplate adjacent to the fuel cell stack.

2. The manufacturing method according to claim 1, further comprising a fifth step performed prior to the second step to measure a length of the fuel cell stack in the lamination direction when the predetermined load is exerted on the fuel cell stack, and adjust a length of the first fastening member in accordance with the measured length.

3. The manufacturing method according to claim 2, wherein, in the fifth step, the length of the first fastening member is adjusted by adjusting a position in which at least one of the first end portion and the second end portion of the first fastening member is folded back in order to form the first connecting portion in hole form.

* * * * *